(12) United States Patent
D'Aluisio (10) Patent No.: US 7,837,212 B2
(45) Date of Patent: Nov. 23, 2010

(54) HANDLEBAR STEM FOR A BICYCLE (75) Inventor: Chistopher P. D'Aluisio, Corralitos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 74 days.

(21) Appl. No.: 12/392,870

(22) Filed: Feb. 25, 2009

(65) Prior Publication Data
US 2010/0213684 A1 Aug. 26, 2010

(51) Int. Cl.
B62K 3/00 (2006.01)
(52) U.S. Cl. ............ 280/281.1; 280/279; 280/288.3; 74/551.8
(58) Field of Classification Search ........... 280/281.1, 280/279, 274, 264, 288.3; 74/551.8; 188/24.11
See application file for complete search history.

(56) References Cited

U.S. PATENT DOCUMENTS

| 4,026,165 | A |   | 5/1977  | Papp            |          |
|-----------|---|---|---------|-----------------|----------|
| 4,753,448 | A |   | 6/1988  | Nagashima       |          |
| D307,405  | S |   | 4/1990  | Kiyota          |          |
| 5,163,339 | A | * | 11/1992 | Giard et al.    | 74/551.3 |
| 5,265,496 | A | * | 11/1993 | Townsend        | 74/551.8 |
| 5,324,059 | A |   | 6/1994  | Bryne           |          |
| D348,636  | S |   | 7/1994  | Williams et al. |          |
| 5,411,280 | A |   | 5/1995  | Allsop et al.   |          |
| 5,415,423 | A | * | 5/1995  | Allsop et al.   | 280/281.1|
| 5,517,878 | A | * | 5/1996  | Klein et al.    | 74/551.3 |
| 5,782,139 | A |   | 7/1998  | Fraiman         |          |
| 6,017,048 | A | * | 1/2000  | Fritschen       | 280/281.1|
| 6,058,800 | A | * | 5/2000  | Giard           | 74/551.1 |
| 6,308,806 | B1| * | 10/2001 | Nielsen         | 188/24.11|

(Continued)

FOREIGN PATENT DOCUMENTS

FR  2661390  10/1991

(Continued)

OTHER PUBLICATIONS

CYCLINGNEWS.COM, Pro bike: Kim Kirchen's Team Columbia Giant TT Prototype, Jul. 25, 2008, 8 pages, Retrieved on Feb. 9, 2009 from http://www.cyclingnews.com/road/2008/tour08/tech/index.php?id=/photos/2008/tech/probik.

Primary Examiner—Lesley Morris
Assistant Examiner—Tashiana Adams
(74) Attorney, Agent, or Firm—Michael Best & Friedrich LLP (57) ABSTRACT A bicycle comprising a frame including a head tube, a fork rotationally coupled to the head tube, and a wheel rotationally coupled to the fork. The fork includes a crown, two legs extending downward from the crown, and a steerer tube extending upward from the crown and through the head tube. A handlebar and brake assembly is detachably secured to the fork. The assembly includes a stem, a handlebar secured to the stem, a clamp secured to an upper end of the steerer tube, a strap secured to the crown, a brake mount supported by the stem, and a brake secured to the brake mount. In one embodiment, the stem is hollow, and the bicycle further includes a brake cable to move the brake. In this embodiment, the brake cable and the brake are at least partially positioned within the hollow stem.

18 Claims, 9 Drawing Sheets

U.S. PATENT DOCUMENTS

| | | |
|---|---|---|
| 6,505,699 B1 * | 1/2003 | Christini et al. ............. 180/224 |
| 6,694,842 B1 * | 2/2004 | Chen .......................... 74/551.3 |
| 6,955,372 B1 * | 10/2005 | Fritschen ................. 280/281.1 |
| 7,210,694 B2 * | 5/2007 | Trenne ....................... 280/279 |
| RE40,200 E * | 4/2008 | Fritschen ................. 280/281.1 |
| 7,571,920 B2 * | 8/2009 | Lane .......................... 280/279 |
| 7,698,967 B2 * | 4/2010 | Ording et al. .............. 74/551.8 |
| 2002/0108465 A1 * | 8/2002 | Rocket ...................... 74/551.1 |
| 2006/0022427 A1 | 2/2006 | Grant |
| 2006/0145446 A1 * | 7/2006 | Schmider ................. 280/281.1 |
| 2007/0222176 A1 | 9/2007 | Nicol |
| 2008/0035431 A1 * | 2/2008 | Vroomen et al. ......... 188/24.21 |
| 2008/0036170 A1 | 2/2008 | Vroomen et al. |
| 2008/0073870 A1 | 3/2008 | Lane |
| 2010/0117330 A1 * | 5/2010 | Lewis ......................... 280/279 |

FOREIGN PATENT DOCUMENTS

| | | |
|---|---|---|
| WO | 2007121362 | 10/2007 |

* cited by examiner

HANDLEBAR STEM FOR A BICYCLE

BACKGROUND

The present invention relates generally to bicycles, and more specifically to systems for mounting handlebars and brakes.

Bicycles commonly have a main frame and a front fork pivotally secured to the main frame. The main frame typically includes a rear wheel mount (commonly called a rear dropout) for receiving a rear wheel axle, and the front fork typically includes a front wheel mount (commonly called a front dropout) for receiving a front wheel axle. Steering control of the bicycle is provided by a handlebar that is usually secured to the front fork through a handlebar stem.

The speed of the bicycle can be controlled by brakes. One type of brake is a rim brake that has brake pads that can be squeezed against the rims of the wheel. A rear brake can be mounted to the main frame near the rear wheel rim, and a front brake can be mounted to the front fork near the front wheel rim. Actuation of the brakes is commonly provided by brake levers.

SUMMARY

The present invention provides a bicycle comprising a frame including a head tube, a fork rotationally coupled to the head tube, and a wheel rotationally coupled to the fork. The fork includes a crown, a leg (e.g., two legs) extending downward from the crown, and a steerer tube extending upward from the crown and through the head tube. The bicycle further includes a handlebar and brake assembly detachably secured to the fork. The assembly includes a stem, a handlebar secured to the stem, a clamp secured to an upper end of the steerer tube, a fixing portion (e.g., a strap) secured to the crown, a brake mount (e.g., a stud) supported by the stem, and a brake secured to the brake mount.

In one embodiment, the stem is hollow, and the bicycle further includes a brake lever mounted on the handlebar and adapted to move a brake actuator (e.g., a cable) to move the brake. In this embodiment, the brake actuator and the brake are at least partially positioned within the hollow stem. Preferably, the stem includes a hollow body and a cap, and the handlebar is sandwiched between the body and the cap.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
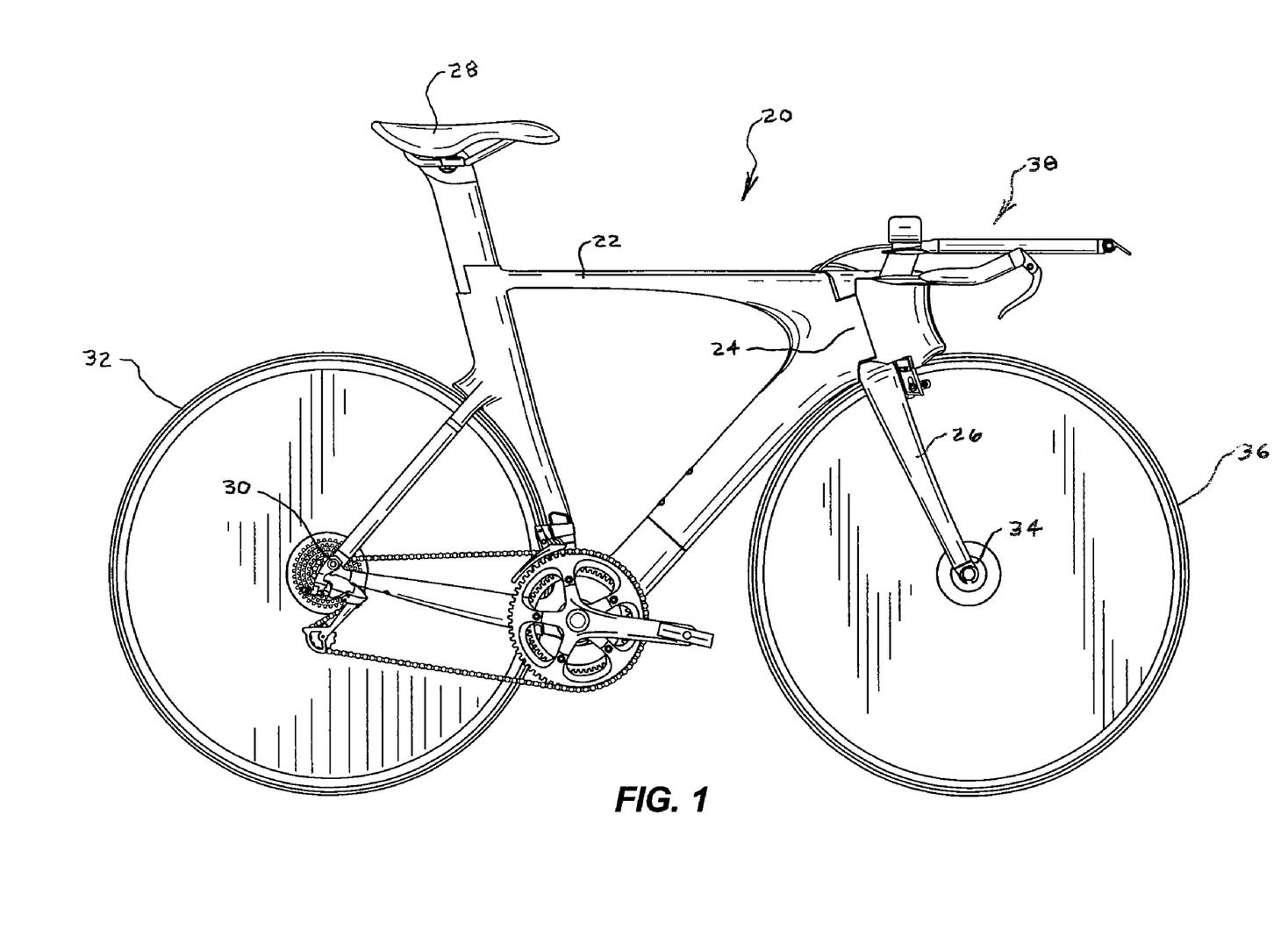
FIG. 1 is a side view of a bicycle embodying the present invention.
Figure 2:
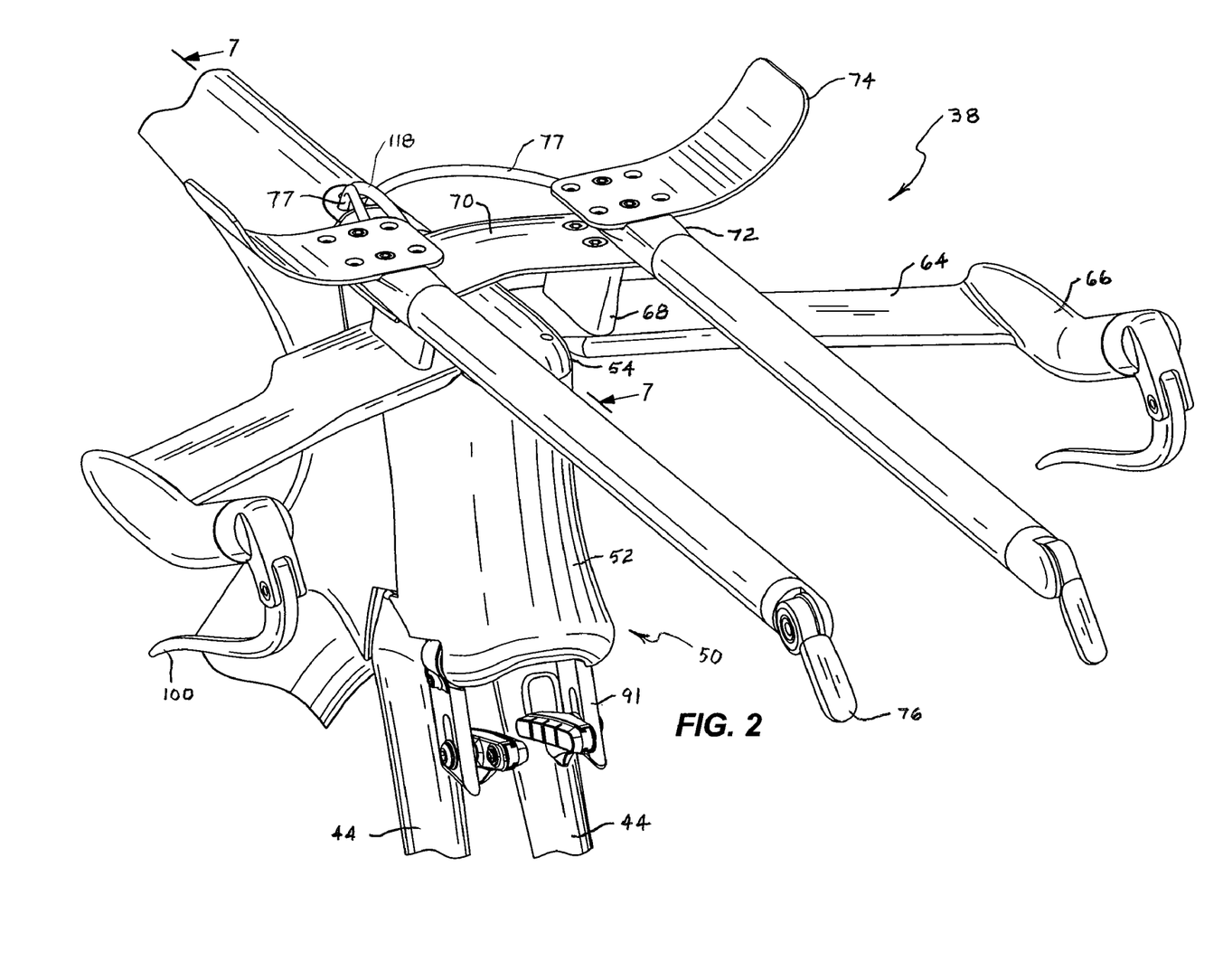
FIG. 2 is a front perspective view of a front portion of the bicycle illustrated in FIG. 1, including a handlebar and stem assembly.

FIG. 1 illustrates a bicycle 20 including a main frame 22 having a head tube 24, a front fork 26 rotationally supported by the head tube 24, and a seat 28 supported by the main frame 22. The main frame 22 further includes two rear dropouts 30 secured to an axle of a rear wheel 32. The front fork 26 includes two front dropouts 34 engaged with an axle of a front wheel 36. A handlebar and brake assembly 38 is secured to the front fork 26, as described in more detail below.

Figure 3:
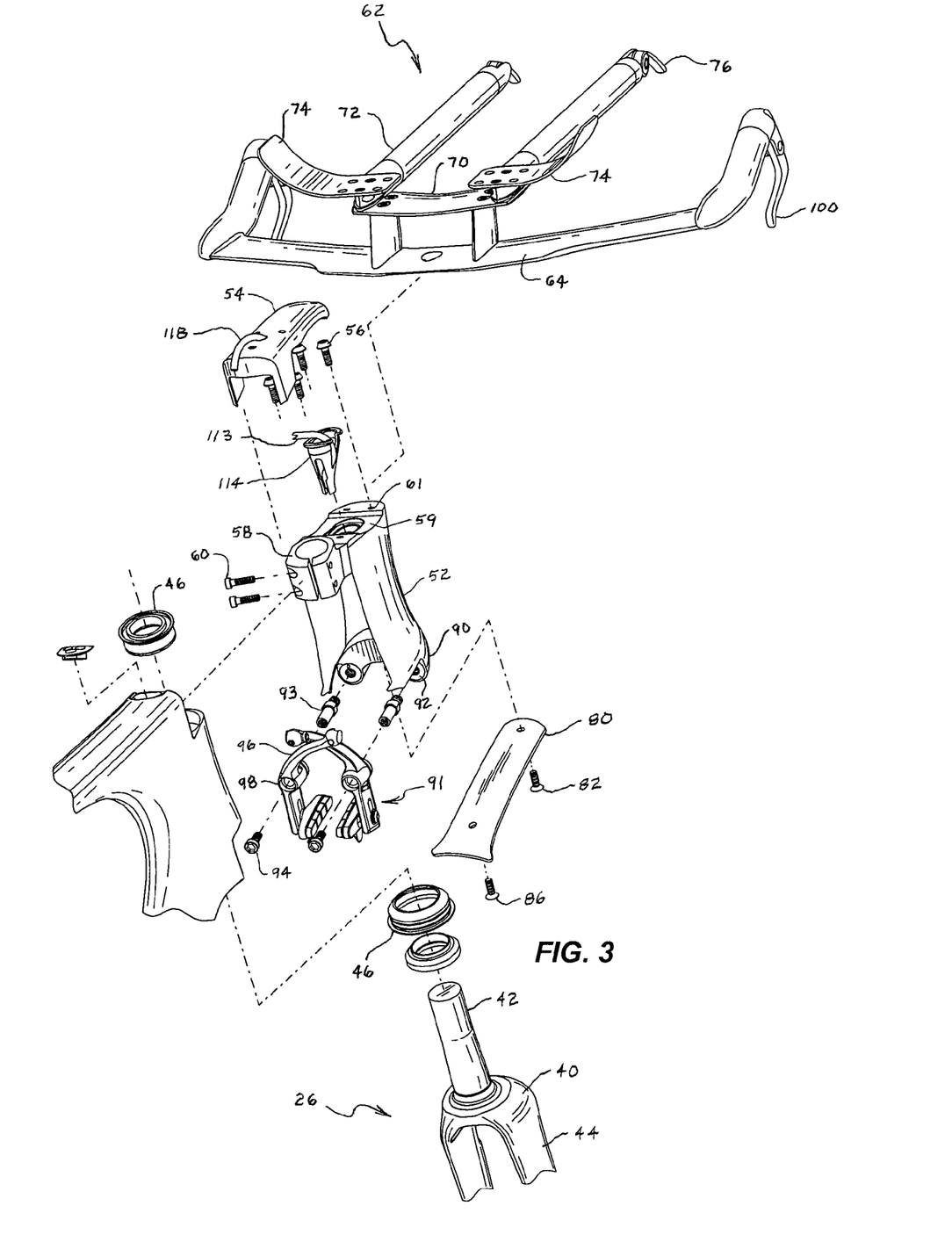
FIG. 3 is an exploded perspective view of the front portion of the bicycle in FIG. 2.
Figure 4:
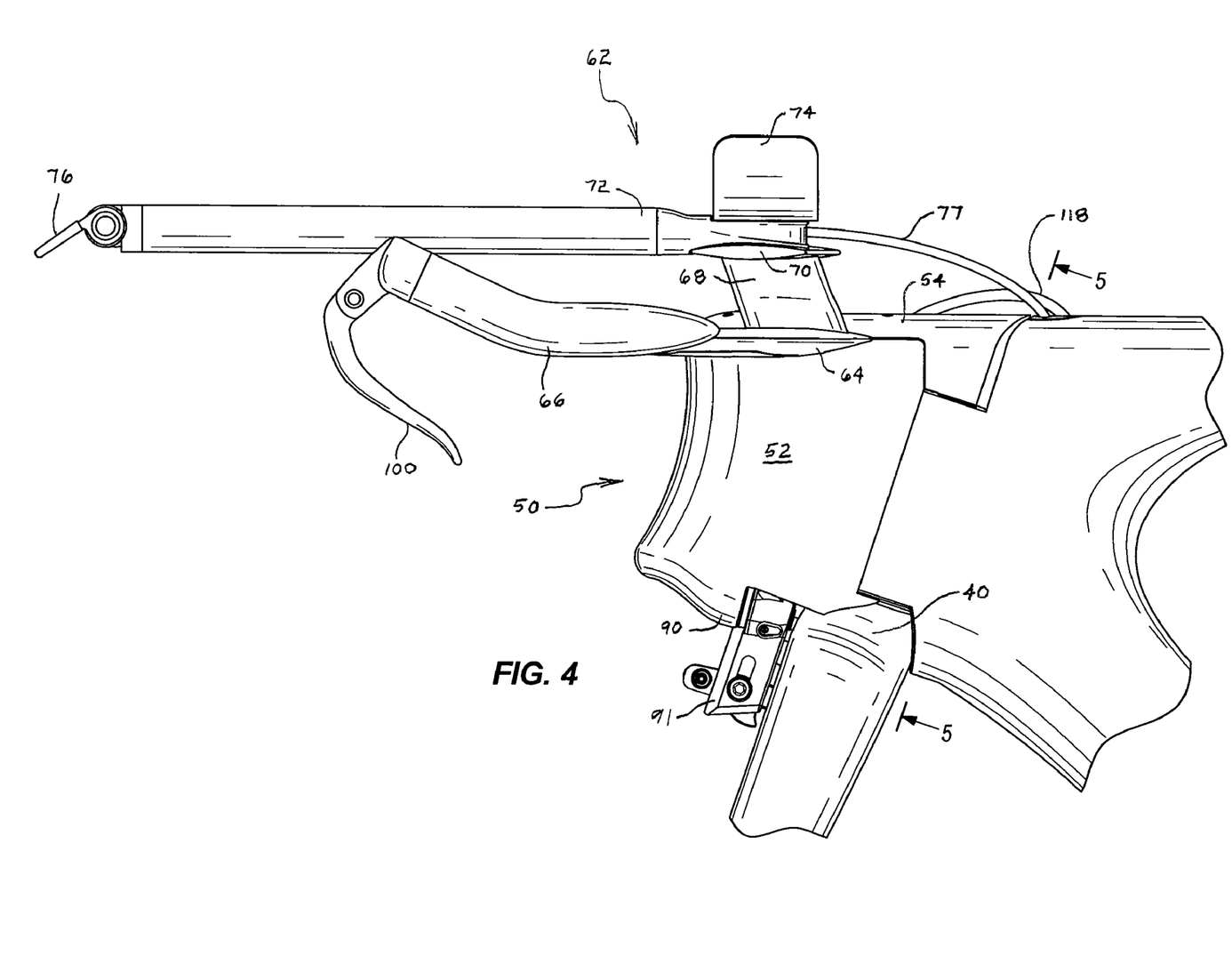
FIG. 4 is a side view of the front portion of the bicycle in FIG. 2.
Figure 7:
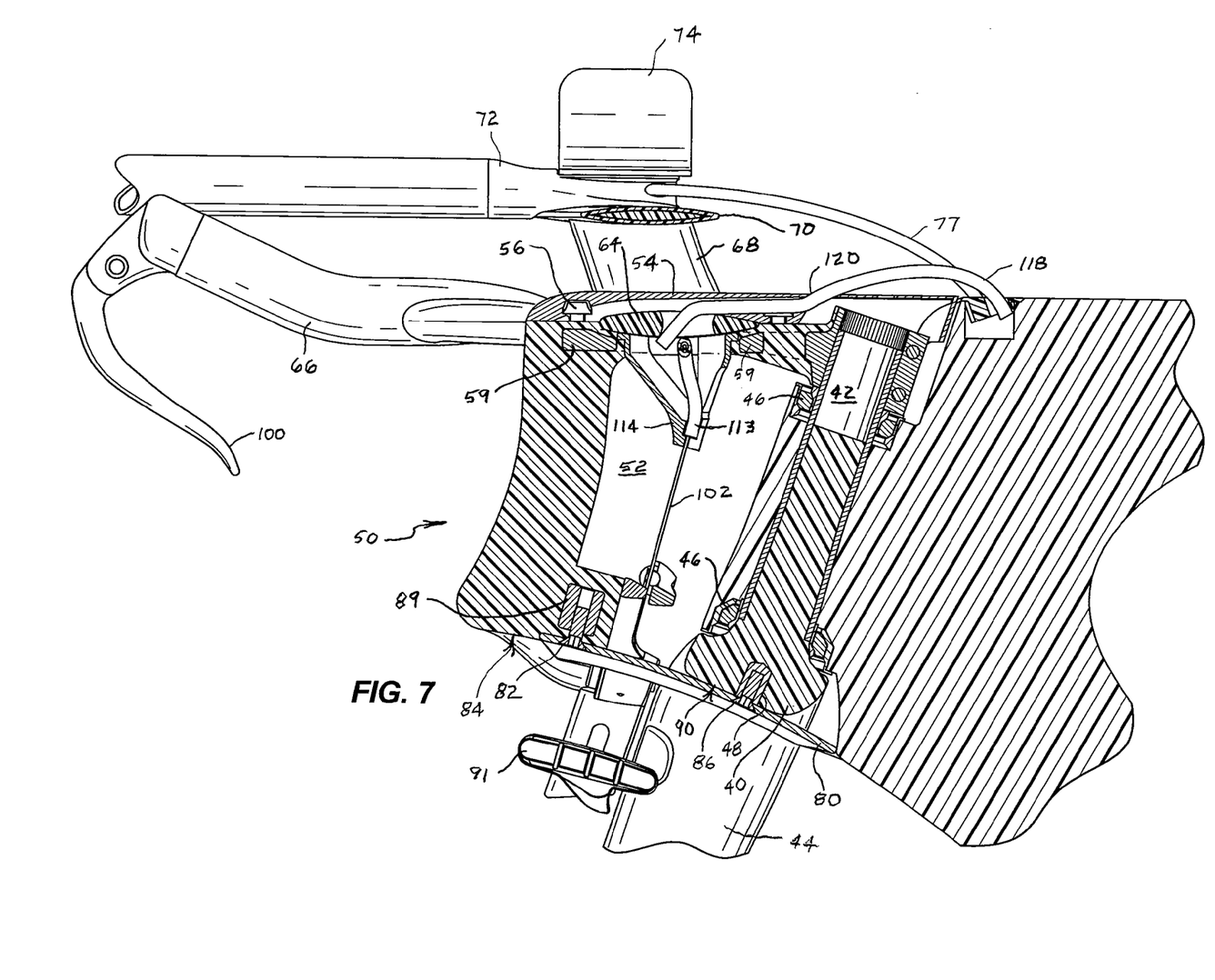
FIG. 7 is a section view taken along line 7-7 in FIG. 2.
Figure 8:
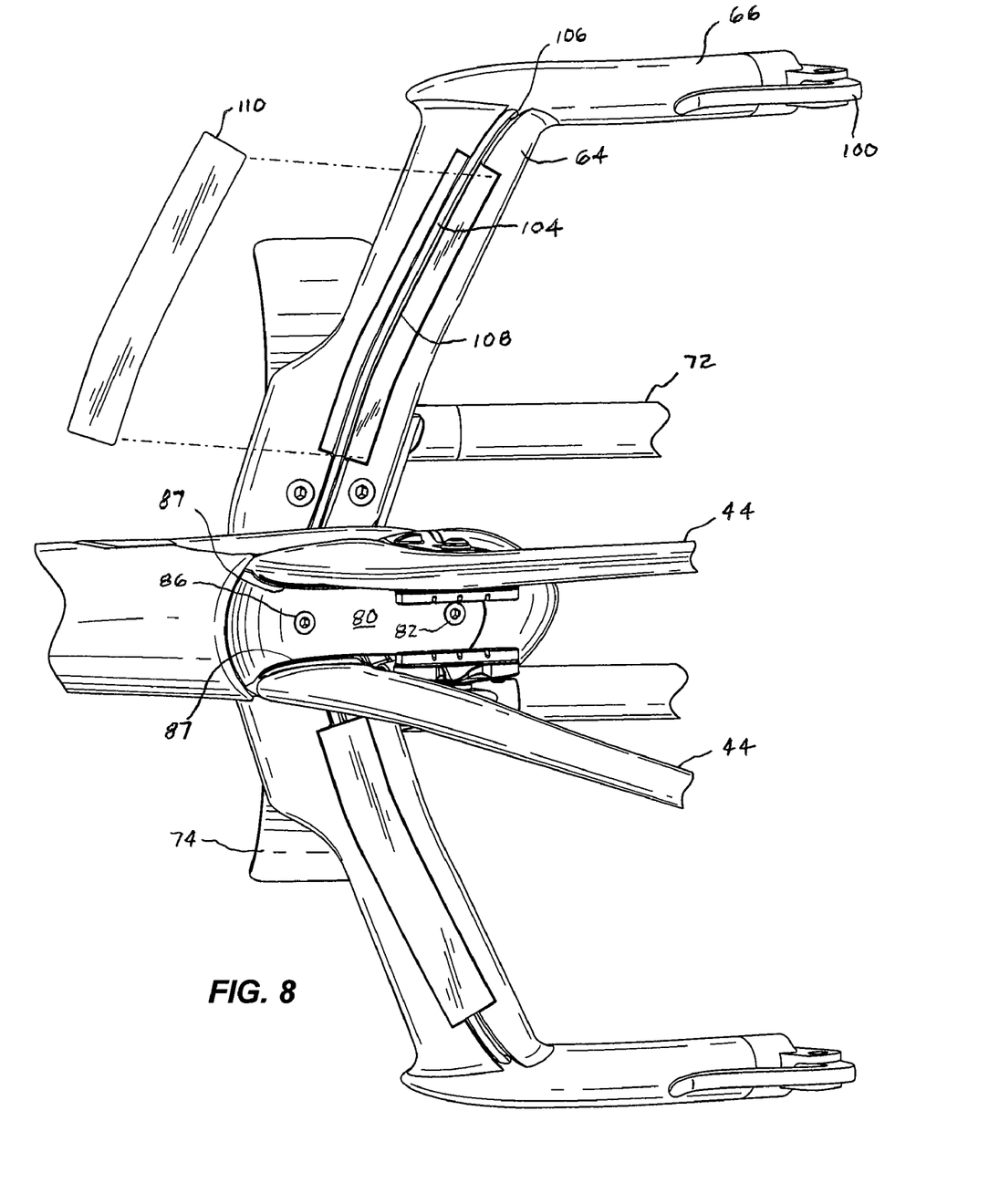
FIG. 8 is a bottom perspective view of the front portion of the bicycle in FIG. 2.
Figure 9:
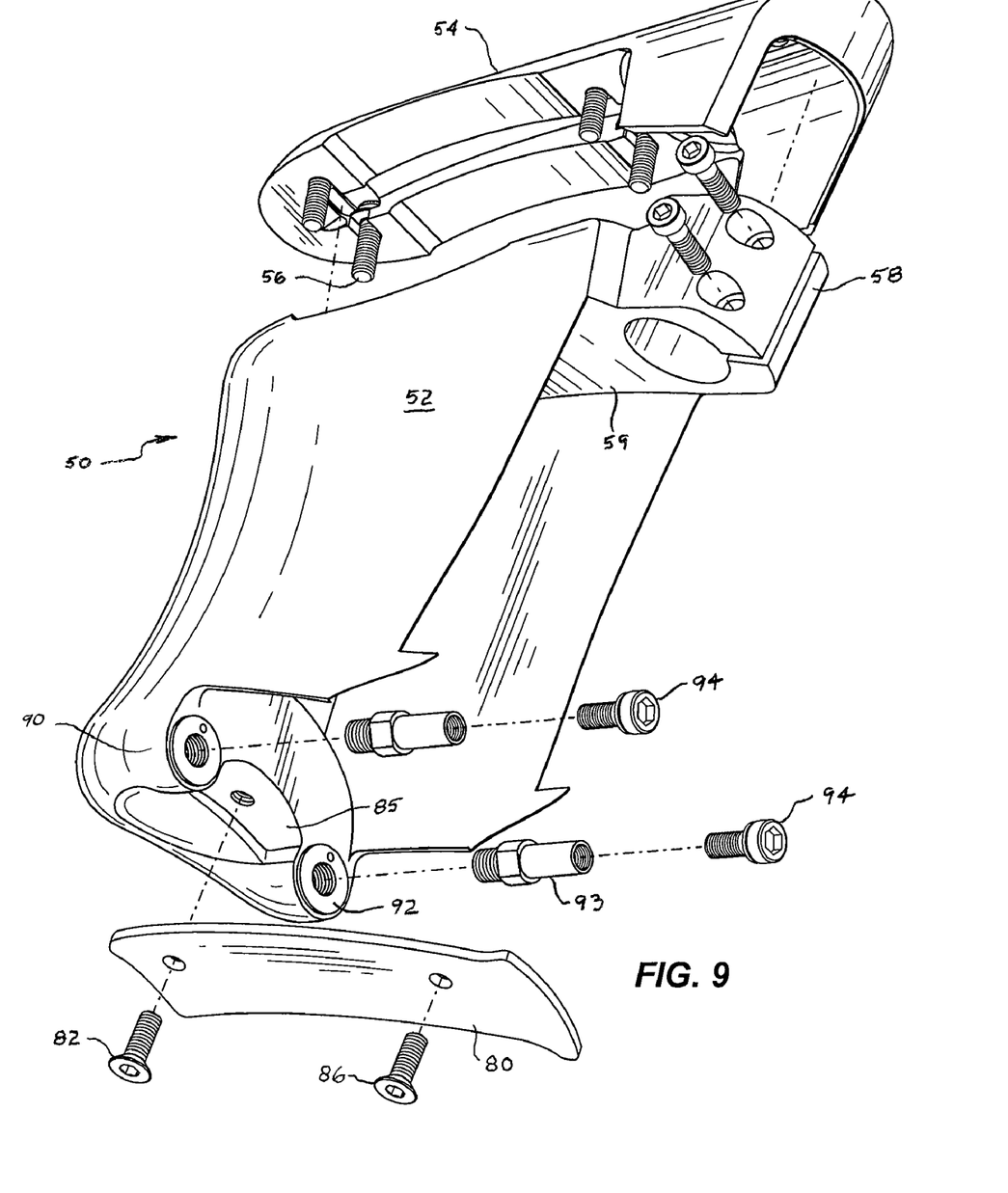
FIG. 9 is a rear perspective view of a portion of the bicycle illustrated in FIG. 1.

Referring to FIGS. 3 and 7, the fork 26 includes a crown 40, a steerer tube 42 extending upward from the crown 40, and two legs 44 extending downward from the crown 40. The lower end of each leg 44 is secured to one of the above-referenced front dropouts 34. The steerer tube 42 is positioned through the head tube 24 of the main frame 22 and is mounted for rotation relative to the head tube 24 by upper and lower bearings 46 (see FIGS. 3 and 7). The illustrated fork is made of a composite material including a carbon fiber epoxy crown 40 and legs 44, and a metal (e.g., steel or aluminum) steerer tube 42 and front dropouts 35. The fork 27 includes a metal insert 48 (FIG. 7) that forms a threaded hole that receives a fastener, as described below in more detail.

Referring to FIGS. 2-9, the handlebar and brake assembly 38 includes a stem 50 having a hollow body 52 and a cap 54 secured to the top of the hollow body 52 by four fasteners in the form of screws 56. The illustrated body 52 is made of a composite material, including carbon fiber epoxy, and the illustrated cap 54 is made of metal, including aluminum.

A clamp 58 is incorporated with the stem 50 and is dimensioned to clamp an upper end of the steerer tube 42 such that the fork 26 is suitably retained within the head tube 24 of the main frame 22. The clamp 58 further ensures that the stem 50 is fixed to the fork 26 for rotational movement relative to the main frame 22. The clamp 58 is tightened by two fasteners in the form of screws 60. The illustrated clamp is made of a metal (e.g., aluminum or steel), and is integrated with an insert 59 (FIGS. 7 and 9) that forms threaded openings 61 (FIG. 3) for receiving the screws 56 that attach the cap 54.

The handlebar and brake assembly 38 further includes a handlebar 62 secured to the stem 50 such that movement of the handlebar 62 results in movement of the stem 50 and the fork 26. The handlebar 62 includes a base bar having an aerodynamic portion 64 and bar ends 66 on the ends of the aerodynamic portion 64. The middle of the aerodynamic portion 64 is sandwiched between the hollow body 52 and the cap 54 in a secure manner to inhibit relative movement between the handlebar 62 and the stem 50. The base bar is made of a composite material, including carbon fiber epoxy and/or aluminum.

The handlebar 62 further includes two towers 68 extending upward from the aerodynamic portion 64, and a cross bar 70 connecting the upper ends of the towers 68. A handlebar extension 72 extends forwardly from each end of the cross bar 70, and arm pads 74 are mounted on top of each extension 72. A gear shift lever 76 is mounted on the front end of each extension 72, and corresponding shift cable housings 77 route shift cables (not shown) to the main frame, as is known in the art. The towers 68, cross bar 70, and extension 72 are made of a composite material, including carbon fiber epoxy and/or aluminum.

The handlebar and brake assembly 38 further includes a fixing portion in the form of a strap 80 connecting a lower end of the hollow body 52 with a lower end of the crown 40. More specifically, a fastener in the form of a bolt 82 secures one end of the strap 80 to a lower surface 84 of the hollow body 52, and another fastener in the form of a bolt 86 secures the other end of the strap 80 to a lower surface 88 of the fork crown 40. The lower surface 84 of the hollow body 52 includes a contoured recess 85 (FIG. 9) that is shaped to match the contour of the end of the strap 80 to thereby provide a keyed interface between the strap 80 and the body 52. Similarly, the lower surface 88 of the crown 40 includes a contoured recess 87 (FIG. 8) that is shaped to match the contour of the other end of the strap 80 to thereby provide a keyed interface between the strap 80 and the crown 40. The strap 80 provides further structural connection between the stem 50 and the fork 26 to limit relative movement between the stem 50 and the fork 26. The fixing portion is made of a composite material, including carbon fiber epoxy and/or aluminum, and includes a metal insert 89 (FIG. 7) for forming a threaded hole that receives the bolt 82 for attachment of the strap 80.

The handlebar and brake assembly 38 further includes a brake mount 90 on the lower end of the hollow body 52 near the strap 80. The brake mount 90 provides a location on the stem 50 for mounting a brake 91. In the illustrated embodiment, the brake mount 90 includes two metal inserts 92 that form threaded holes that each receive a brake stud 93 threaded into each insert 92 for supporting the brake 91. Screws 94 secured each brake arm onto the corresponding stud 93

The illustrated brake 91 is a dual-pivot, center-pull brake having two brake arms 96. Each brake arm 96 includes a pivot point 98 that is pivotally mounted on a corresponding stud 93 of the brake mount 90. In this regard, it can be seen that the illustrated brake 91 is mounted to and supported by the body 52 of the stem 50. That is, when the stem 50 is removed from the bicycle, the brake 91 is also removed from the bicycle and stays mounted to the stem 50. By virtue of this design, the brake can be easily installed, adjusted, and serviced on the stem 50. In addition, it can be seen that a portion of the brake 91 (i.e., from the pivot points 98 to the upper end of the arms 96) is hidden within the stem body 52, which provide beneficial aerodynamic properties.

Referring to FIGS. 4-8, the bicycle 20 further includes a brake lever 100 mounted on each bar end 66 of the base bar. One brake lever 100 controls the front brake 91 and the other brake lever 100 controls a rear brake (not shown). Each brake lever 100 is coupled to a brake actuator in the form of a cable 102 for actuating the corresponding brake. The cable 102 passes through a cable housing 104 that is routed through a hole 106 (FIG. 8) in the corresponding bar end 66 and through a longitudinal recess 108 in the lower surface of the aerodynamic portion 64 of the base bar.

Figure 5:
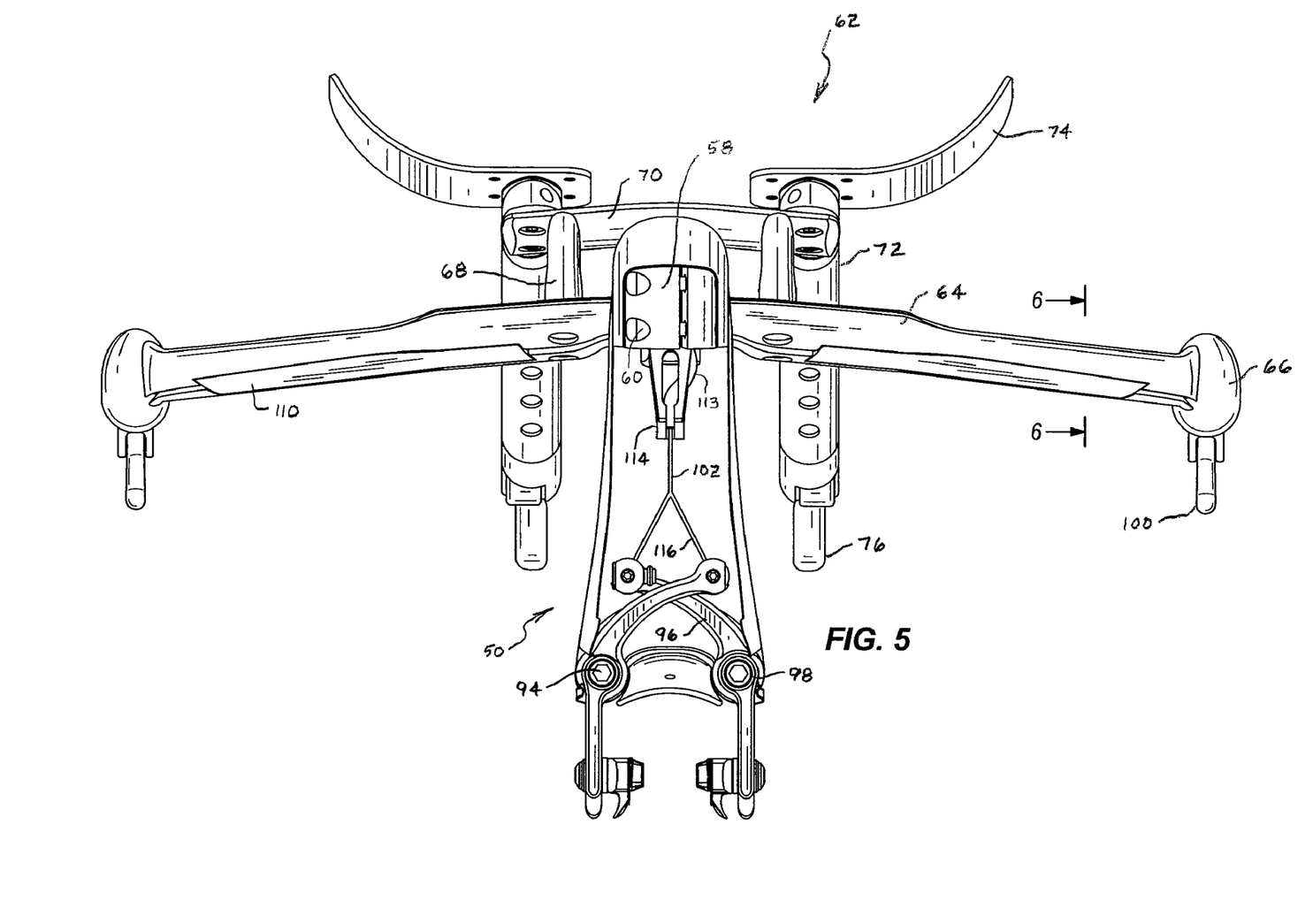
FIG. 5 is a rear view of the handlebar and stem assembly taken along line 5-5 in FIG. 4.
Figure 6:
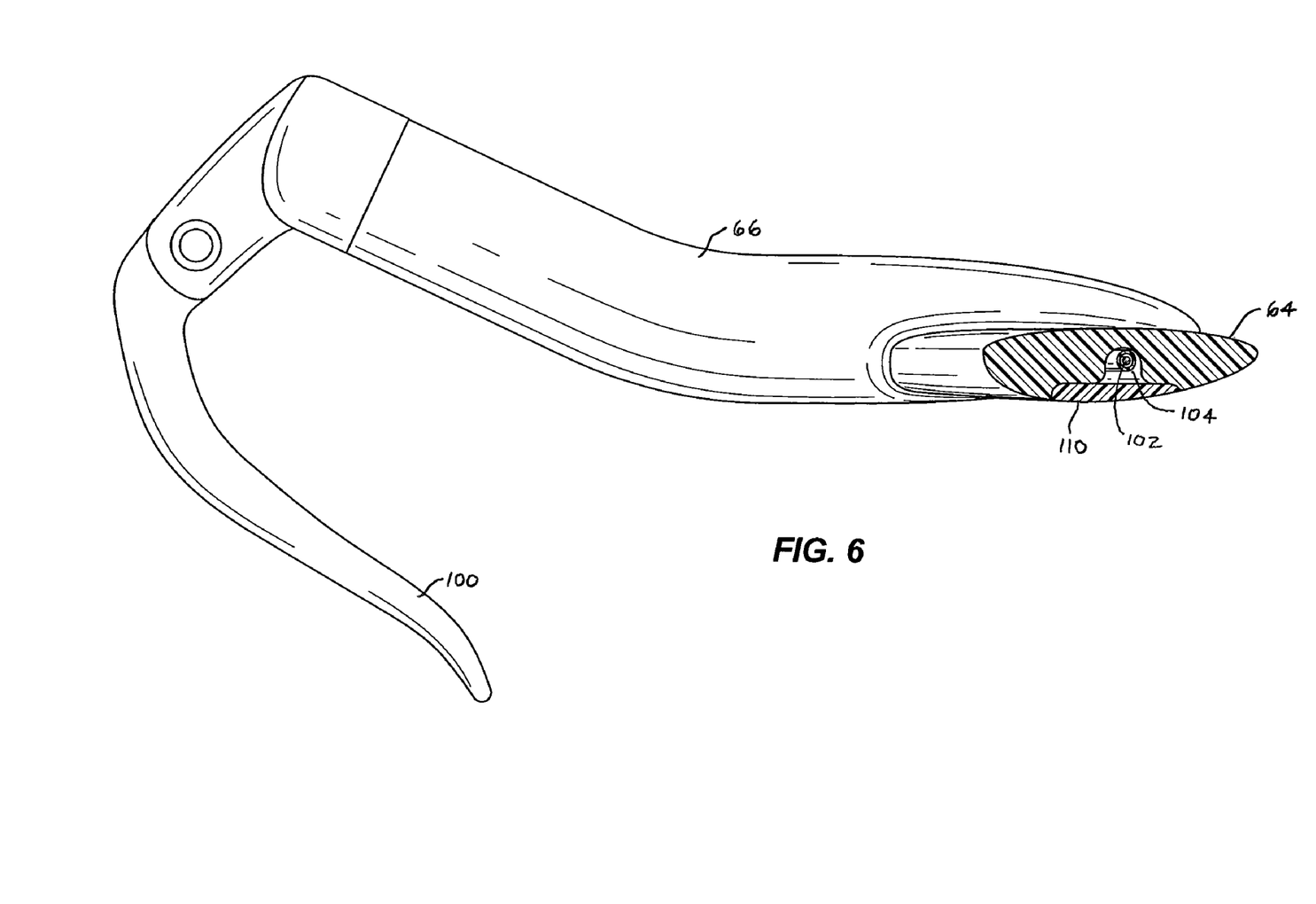
FIG. 6 is a section view taken along line 6-6 in FIG. 5.

A cover 110 (FIGS. 6 and 8) is secured (e.g. taped or glued) over the recess 108 to hold the cable housing 104 in place. Toward the center of the aerodynamic portion 64, the cable 102 and housing 104 enters the hollow body 52 of the stem 50. Referring to FIGS. 5 and 7, one cable housing (e.g., the "front housing" 113) then passes through and terminates in a housing stop 114 that is positioned within the hollow body 52. The corresponding cable 102 continues through the housing stop 114 and is secured to the front brake using a yoke 116, as is generally known in the art. The other cable housing (e.g., the "rear" housing 118) passes through an opening 120 in the cap 54 and then enters the main frame 22 for routing to the rear brake. By placing both the brake 91 and the housing stop 114 on the stem, servicing of the brake 91 is facilitated by allowing the stem 50 to be removed from the bike without disconnecting the brake cable.

What is claimed is:

1. A bicycle comprising:
   a frame including a head tube;
   a fork rotationally coupled to the head tube and including a crown, a leg extending downward from the crown, and a steerer tube extending upward from the crown and through the head tube;
   a wheel rotationally coupled to the leg; and
   a handlebar and brake assembly detachably secured to the fork, the assembly including:
      a stem;
      a handlebar secured to the stem;
      a clamp secured to an upper end of the steerer tube;
      a fixing portion secured to the crown;
      a brake mount supported by the stem; and
      a brake secured to the brake mount.

2. A bicycle as claimed in claim 1, wherein the fork includes two legs extending downward from the crown, each leg being rotationally coupled to the wheel.

3. A bicycle as claimed in claim 1, wherein the stem is hollow, and wherein the bicycle further includes a brake lever mounted on the handlebar and adapted to move a brake actuator to move the brake, the brake actuator and the brake being at least partially positioned within the hollow stem.

4. A bicycle as claimed in claim 3, wherein the brake actuator comprises a cable.

5. A bicycle as claimed in claim 3, wherein the brake mount includes a stud secured to the stem, wherein the brake includes a brake arm pivotally mounted to the stud, wherein a portion of the brake arm between the stud and the actuator is positioned in the stem.

6. A bicycle as claimed in claim 1, wherein the stem includes a hollow body and a cap, and wherein the handlebar is sandwiched between the body and the cap.

7. A bicycle as claimed in claim 1, wherein the fixing portion includes a strap secured on one end to a lower surface of the crown.

8. A bicycle comprising:
   a frame including a head tube;
   a fork rotationally coupled to the head tube and including a crown, a leg extending downward from the crown, and a steerer tube extending upward from the crown and through the head tube;
   a wheel rotationally coupled to the leg;
   a hollow stem secured for rotation with the fork;
   a handlebar secured to the stem; and
   a brake secured for rotation with the fork, at least a portion of the brake being positioned within the hollow stem.

9. A bicycle as claimed in claim 8, further comprising a brake lever mounted on the handlebar and adapted to move a brake actuator to move the brake, at least a portion of the brake actuator being positioned within the hollow stem.

10. A bicycle as claimed in claim 9, wherein the brake actuator comprises a cable.

11. A bicycle as claimed in claim 8, further comprising a brake mount including a stud secured to the stem, wherein the brake includes a brake arm pivotally mounted to the stud, and wherein at least a portion of the brake arm between the stud and the actuator is positioned in the hollow stem.

12. A bicycle as claimed in claim 8, wherein the stem includes a hollow body and a cap, and wherein the handlebar is sandwiched between the body and the cap.

13. A bicycle as claimed in claim 8, further comprising a fixing portion including a strap connecting the stem to the crown.

14. A handlebar and brake assembly adapted to be secured to a bicycle fork having a fork crown and a steerer tube, the assembly including:
 a stem;
 a handlebar mount secured to the stem and adapted to receive a handlebar;
 a clamp secured to an upper end of the stem and adapted to engage the steerer tube;
 a fixing portion secured to a lower end of the stem and adapted to engage the fork crown; and
 a brake mount supported by the stem and adapted to support a brake, the brake mount including a stud secured to the stem, and the brake including a brake arm pivotally mounted to the stud, wherein at least a portion of the brake arm is positioned in the stem.

15. A handlebar and brake assembly as claimed in claim 14, further comprising a handlebar secured to the handlebar mount.

16. A handlebar and brake assembly as claimed in claim 14, wherein the stem includes a hollow body and a cap, and wherein the handlebar is sandwiched between the body and the cap.

17. A handlebar and brake assembly as claimed in claim 14, further comprising a brake secured to the brake mount.

18. A handlebar and brake assembly as claimed in claim 17, wherein the stem is hollow, and wherein the brake is at least partially positioned within the hollow stem.

* * * * *